June 9, 1964 P. H. GRIFFIN III 3,136,583
MUD CUTTER
Filed Aug. 5, 1960
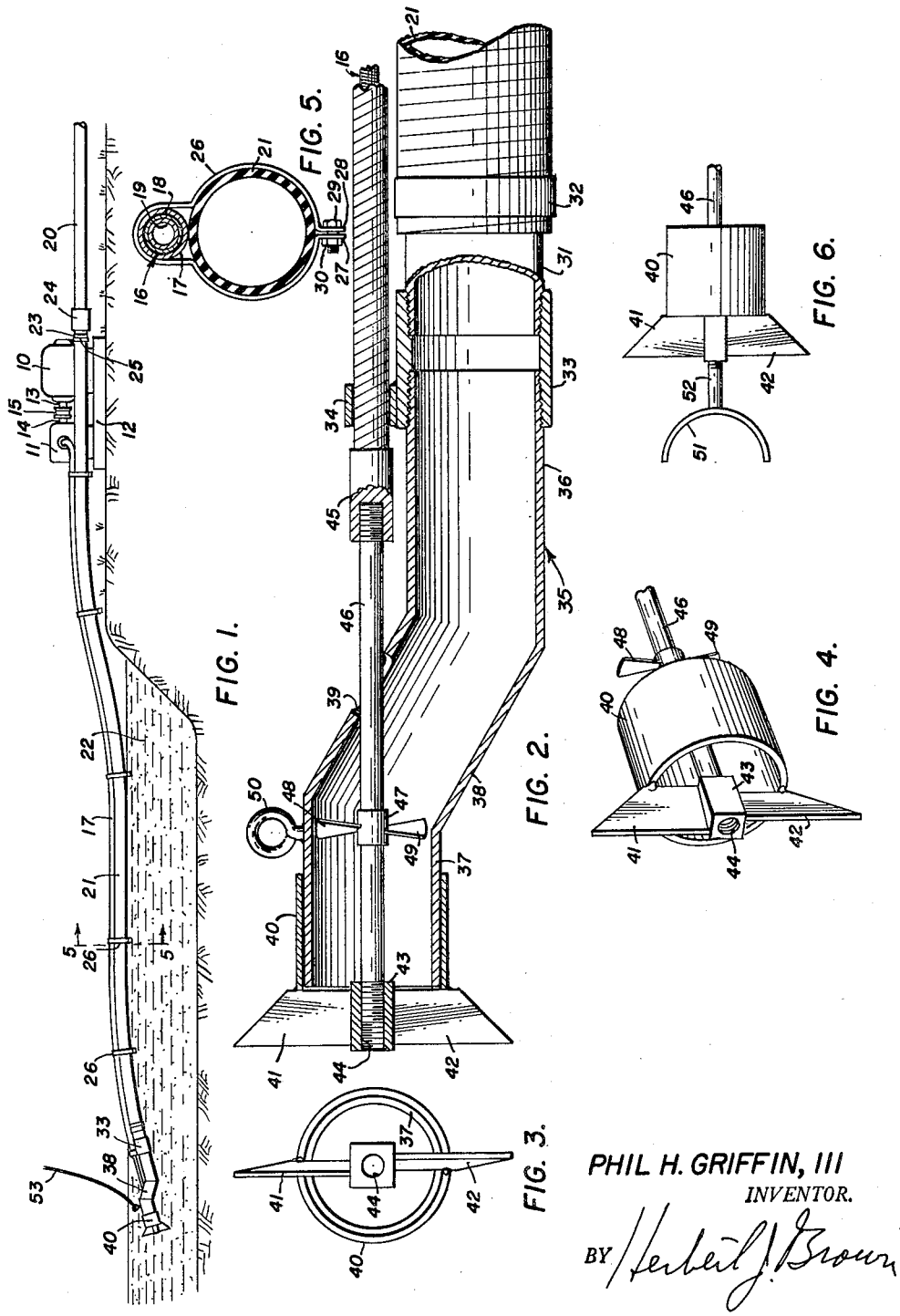
PHIL H. GRIFFIN, III
INVENTOR.
BY *Herbert J. Brown*
ATTORNEY

United States Patent Office 3,136,583
Patented June 9, 1964

3,136,583
MUD CUTTER
Phil H. Griffin III, Fort Worth, Tex., assignor to Bass Brothers Enterprises, Inc., County of Tarrant, Tex., a corporation of Texas
Filed Aug. 5, 1960, Ser. No. 47,632
7 Claims. (Cl. 302—15)

This invention relates to well drilling mud conditioning apparatus and method, and more particularly to the storage and handling of well drilling fluids and has reference to a cutting and agitating attachment for use with the flexible intake pipe or tube of a mud suction line.

Muds of varied types and characteristics may be used in the course of drilling a well with rotary equipment. Muds of different consistencies, densities and constitutions may be used to seal off sections of high porosity and permeability, to suppress bottom hole pressures, to lift and exhaust granular cuttings, and to bridge lost circulation zones. While various drilling muds have their differences, a characteristic common to most drilling muds is a high adsorption coefficient or gel strength arising from the surface tension of finely divided particles incorporated therein. The physical characteristics of some drilling muds while in motion or under agitation vary considerably from the characteristics of the same mud when allowed to stand at rest; this latter phenomenon is also closely associated with the surface active characteristics of many drilling mud ingredients and the gels they form with water. The colloidal action of suspended clays tends to give drilling mud some of the consistency characteristics of a gelatinous semisolid which, under extreme solids-to-water ratios, tends to form coagular masses which congeal about the inlet port of a suction line and tend to block said inlet port. Constituent parts of some drilling muds are very expensive and may constitute a substantial part of the cost of drilling a well. Because some drilling fluids are so costly, these muds may be saved after the drilling of one well and be transported to another where they are kept in auxiliary pits colloquially known as "duck's nests." In other instances, new mud is kept in the duck's nests. Until needed, these auxiliary muds stand in a duck's nest and are subject to surface evaporation of the water in the auxiliary pit. The coagulation mentioned above, thus takes place as loss of water at the surface raises the solids-to-water ratio of the mud, and congealed masses formed thereby tend to break away in large clods from the remainder of the surface of the fluids in the pit and sink to the bottom of the duck's nest. Gelling and settling may also alter the consistency of stored mud. When use of this reserve mud is desired its lack of uniform consistency and the presence of coagulated masses hamper withdrawal of the material through a suction line and may entirely prevent its utilization.

Drilling muds are of no use in a drilling operation unless they can be delivered to the mud pump of the drilling rig; less obvious but equally important is the necessity for immediate availability of some drilling muds in certain oil producing areas. Down time for circulation while awaiting a mud shipment can be very expensive, and failure to suppress excessive bottom hole pressures can lead to the loss of a drill stem in addition to loss of the well.

In accordance with the present invention I prevent clogging at the inlet end of the suction line by fragmenting congealed or coagulated masses in advance of the inlet to said line to produce small sized particles which will not clog the inlet, and thereafter mix said particles with water by means of suitable agitating blades within the suction inlet so as to insure a drilling fluid or mud of substantially uniform consistency prior to its delivery to the usual mud pump.

Accordingly, an object of the present invention is to provide means of agitating an auxiliary mud supply.

Another object of the invention is to provide means for fragmenting coagular masses of drilling mud.

Another object of the invention is to provide means for unblocking the inlet port of a mud suction line.

A further object of the invention is to provide a flexible mud suction line capable of agitating and transporting mud from various parts of a slush pit or auxiliary pit.

A particular object of the invention is to provide means whereby an efficient cutter may be positioned and manipulated with the inlet port of a mud suction line.

An additional object of the invention is to provide a mud cutter for a flexible suction line and which cutter is capable of reducing internal coagulation within the flexible line.

Another object of the invention is to provide a cutter and agitator for a full opening intake port of a mud suction line.

A further object of the invention is to provide a remote power system for a mud pit agitator and cutter mechanism.

These and other objects will become apparent from the following description and the accompanying drawing, wherein:

FIGURE 1 is a side elevational and partially sectional view of the invention in operating position in a mud pit.

FIGURE 2 is an enlarged fragmentary and partially sectional view of the inlet port end of the invention.

FIGURE 3 is a front elevational view of the inlet port of the invention.

FIGURE 4 is a perspective view of the cutter blades, hub rigid shaft and sleeve bearing of the invention.

FIGURE 5 is a sectional view taken along line 5—5 in FIGURE 1.

FIGURE 6 is a side elevational view of an alternate form of construction of the invention.

In the drawing, a motor 10 and a gear reducer 11 are each mounted on a base or skid 12 supported by the surface of the ground. The drive shaft 13 of the motor 10 and the high speed shaft 14 of the gear reducer 11 are disposed in axial alignment with one another and each is engaged by a coupling 15. A flexible shaft 16 positioned within a non-rotatable sheath 17 is coupled to the low speed shaft (not shown) of the gear reducer 11. The flexible shaft 16 may be constructed as any of a variety of commercially available types but is shown in an optional form which includes coaxial inner and outer helical members 18 and 19 adjacently wound in opposite directions with respect to one another for rotation in unison within the sheath 17. A conventional suction pipe 20 extends to proximity with the skid 12; it being understood that the suction pipe 20 is in communication with the suction side of a mud pump (not shown). A flexible inlet tube or pipe section 21 extends from the end of the suction pipe 20 into an auxiliary mud pit generally designated by the numeral 22.

A stub joint 23 threadedly engages a collar 24 which also threadedly engages the end of the suction pipe 20, and the projecting end of the stub joint extends into one end of the flexible tube 21 which is secured to the stub joint by a pressure strap 25, circumjacently positioned about the flexible tube. A plurality of circumferential clamps 26 secure the sheath 17 of the flexible shaft 16 to the exterior wall of the flexible tube 21. The clamps 26 are spaced from one another, and each clamp consists of a single strap of metal conforming generally in shape to the outer diameter of the flexible tube 21 but being spaced therefrom for a portion of the circumference of the flexible tube to accommodate the sheath 17 of the flexible shaft 16. Opposite ends 27 and 28 of each clamp 26 are formed radially outward of the flexible tube 21 at a positon thereon opposite the flexible shaft 16 and a bolt 29 extending through corresponding openings in the ends of each clamp is threadedly engaged by a nut 30 which urges the opposite ends toward one another and draws the remainder of the clamp into frictional engagement with the flexible tube 21 and the sheath 17 of the flexible shaft 16. A second stub joint 31 threaded on one of its ends, has its unthreaded end positioned within the extending end of the flexible tube 21 and a second pressure strap 32 positioned exteriorly about the flexible tube and the second stub joint forces these two members into frictional engagement with one another. The threaded end of the second stub joint 31 extends into and is engaged by a second collar 33 having a cylindrical bracket 34 welded to its outer surface so that the axes of the cylindrical bracket and second collar are parallel with one another.

In accordance with a preferred embodiment of my invention a rigid offset intake pipe nozzle 35, having the axes of its opposite end portions 36 and 37 parallel with but spaced from one another and having an intermediate portion 38 thereof with its axis intersecting the respective axes of the end portions, is threaded on one of its ends 36 and the second collar 33 engages and is affixed to the threaded end of the offset intake pipe. The axes of the opposite ends 36 and 37 and intermediate section 38 of the offset intake pipe 35 lie in a plane which is common with the respective axes of the second collar 33 and the cylindrical bracket 34 welded thereto; and the unthreaded end 37 of the offset intake pipe is coaxial with the cylindrical bracket. An aperture 39 is formed in the wall of the intermediate portion 38 of the offset intake pipe nozzle 35, and the center of this aperture is in alignment with the axes of the unthreaded end 37 thereof and the cylindrical bracket 34 welded to the outer surface of the second collar 33. A sleeve bearing 40 is exteriorly positioned and loosely journaled to the unthreaded end 37 of the offset intake pipe 35 with the interior diameter of the sleeve bearing slightly larger than the exterior diameter of the unthreaded end of the offset intake pipe and with the sleeve bearing extending beyond the end of the offset intake pipe. Pitched cutter blades 41 and 42 for severing congealed masses or clods of drilling mud prior to entry into the intake pipe which leads to the mud pump are attached to and project radially from opposite sides of a hub 43, shown as a rectangular bar having a threaded opening 44 therethrough. The span of the blades 41 and 42 is greater than the diameter of the sleeve bearing 40 and corresponding edges of the blades are welded to one end of the sleeve bearing at diametrically opposed positions thereon and with the threaded opening 44 in the hub 43 coaxially disposed with respect to the axes of the unthreaded end 37 of the offset nozzle 35 and the cylindrical bracket 34 welded to the outer surface of the second collar 33. The flexible shaft 16 and its non-rotatable sheath 17 extend through the cylindrical bracket 34 on the second collar 33, and a coupling head 45, integrally constructed with the flexible shaft and larger in diameter than the sheath, is positioned between and spaced from the cylindrical bracket and the aperture 39 where it projects toward the hub 43. A rigid shaft 46 extends with clearance through the aperture 39 in the wall of the offset intake pipe 35, and its opposite ends respectively threadedly engage the coupling head 45 of the flexible shaft 16 and the threaded opening 44 in the hub 43. The length of the rigid shaft 46 is such that the blades 41 and 42 on the sleeve bearing 40 and hub 43 are spaced from the unthreaded end 37 of the offset intake pipe 35. An interior hub 47 is attached to the rigid shaft 46 within the offset intake pipe or nozzle 35 at a position therein near the junction of the unthreaded end 37 and intermediate portion 38 thereof and agitator blades 48 and 49 having their outer ends spaced from the interior walls of the offset intake pipe are attached to the interior hub 47. A metal hook 50 is attached to the outer surface of the unthreaded end 37 of the offset intake pipe 35 but is spaced thereon from the sleeve bearing 40 and is positioned in vertical alignment with the rigid shaft 46.

In an alternate form of the invention a semi-circular agitator arm 51 is attached at a position intermediate its ends to an auxiliary shaft 52 which threadedly engages the opening 44 in the hub 43 and projects exteriorly of the sleeve bearing 40 therefrom. Opposite ends of the agitator arm 51 lie on a line perpendicular to the axis of the auxiliary shaft 52.

In operation, a cable 53, which may be supported by a float (not shown), is attached to the hook 50 on the unthreaded end portion 37 of the offset intake pipe 35 and may be used to manipulate and position the mud cutter attachment within an auxiliary mud pit. The flexible shaft 16 is driven by the low speed shaft (not shown) of the gear reducer 11 which derives power from the motor 10 and rotates the flexible shaft within its sheath 17. The clamps 26 keep the flexible shaft 16 and flexible tube 21 adjacent one another in a constant spaced relationship during flexure and manipulation. The mud cutter blades 41 and 42 rotate with the hub 43 which is kept in coaxial relationship with the unthreaded portion 37 of the offset intake pipe or nozzle 35 by the sleeve bearing 40 which prevents eccentric positioning of the hub and rigid shaft 46. By their rotation and pitch, the cutter blades 41 and 42 sever congealed masses or clods of drilling mud drawn to the unthreaded end 37 of the offset intake pipe 35 by the vacuum of the suction pipe 21 slush or drilling mud pump. Gelatinous bodies of drilling mud are thus drawn into the offset intake pipe about the rigid shaft 46 and masses thereof which are still too large to be effectively drawn through the turn into the intermediate portion 38 of the offset intake pipe are further broken up by the agitating blades 48 and 49 of the interior hub 47; extensive tests have shown that cohesive masses which pass the agitating blades 48, 49 of the interior hub are sufficiently small in size to travel through remaining bends in the offset intake pipe and the flexible tube 21 without offering appreciable resistance to flow or otherwise blocking the transit of other fluids or semi-solid materials drawn from the mud pit 22.

It will be apparent that since the inlet end of the suction line or pipe is lowered beneath the surface of the mud pit, as indicated in the drawing in FIG. 1, fluids in liquid form, as well as particles broken up by the cutter blades 41 and 42, will be drawn into the suction pipe inlet, and these will be further mixed by the agitator blades 48, 49 within the suction nozzle, so that a fluid of relatively uniform consistency and containing only small sized solids will ultimately be delivered to the mud pump.

Torque has a tendency to foreshorten the flexible shaft 16 during operation of the invention; the spacing of the cutter blades 41 and 42 from the unthreaded end 37 of the offset intake pipe 35 compensates for this foreshortening effect and permits the blades to rotate without frictional engagement with any part of the apparatus.

The agitator arm 51 may be used to enhance the agitating action of the invention and may also be used as a premixer and cutter for masses of mud approaching a solid state.

The invention is not limited to the exemplary construction herein shown and described, but may be made in various ways within the scope of the appended claims.

What is claimed is:

1. An intake system for a mud pump, said system comprising: a flexible tube communicating with the suction side of said mud pump and extending into a mud pit, a prime mover including a drive shaft positioned near said flexible tube, a flexible shaft coupled to said drive shaft of said prime mover and extending in spaced relationship from said flexible tube into said mud pit, a non-rotatable sheath about said flexible shaft, a plurality of brackets spaced from one another along the length of said flexible tube and engaging said sheath of said flexible shaft, an offset intake pipe connected at one of its ends to and communicating with one end of said flexible tube and having the opposite end portion thereof extending with its axis parallel with but spaced from the axis of its connected end and having an intermediate portion thereof with its axis intercepting said axes of said end portions, an opening in a wall of said intermediate portion of said offset intake pipe at the intersection of the axis of said extending end portion of said offset intake pipe therewith, a sleeve journaled about said extending end portion of said offset intake pipe and having the extending end of said sleeve extending beyond the corresponding end of said offset intake pipe, a hub positioned within said sleeve concentric with the extending end portion thereof, blades extending radially from said hub to said extending end of said sleeve and secured at their opposite ends to said hub and said sleeve, a shaft secured to said hub and extending therefrom through said opening in said intermediate portion of said offset intake pipe to engage with said flexible shaft, a collar attached to said shaft within the extending end portion of said offset intake pipe near the intersection of the respective axes of said extending end portion and said intermediate portion of said offset intake pipe, pitched blades attached to and projecting radially from said collar, and means manipulating said offset intake pipe within said mud pit.

2. A drilling mud cutter for use in breaking up coagulated masses of drilling mud in an auxiliary mud pit or "duck nest" prior to entry into the inlet end of a suction inlet pipe connected at its opposite end to the mud pump of a drilling rig, including a flexible inlet tube, a rigid intake pipe or nozzle attached to and communicating with said flexible tube at the extended end thereof within said pit, a hub positioned at the extending end of said intake pipe, means journaled to said intake pipe locating the axis of said hub, external mud cutter blades projecting radially from said hub with respect to its located axis, a prime mover positioned exteriorly of said pit and a flexible shaft connected at its opposite ends to said prime mover and to said hub.

3. The combination as defined in claim 2 and including a plurality of brackets attached to said flexible tube and spaced from one another along the length of said flexible tube and means rotatably securing said flexible shaft to said brackets.

4. In a flexible tube communicating with the intake of a slush pump and extending into a reservoir of slurried fluids, an intake pipe attached to and communicating with the extending end of said flexible tube, a sleeve loosely journaled to the projecting end of said intake pipe and with the projecting end of said sleeve extending beyond the projecting end of said intake pipe, a hub coaxially positioned within said sleeve at the projecting end thereof, blades extending radially from said hub and attached at their outer ends to said sleeve, a prime mover positioned exteriorly of said reservoir and flexible means rotatably coupling said hub to said prime mover.

5. A mud conditioning attachment for breaking up coagulated masses or slurried fluids such as drilling mud to prevent internal coagulation within the suction inlet line leading from a mud supply pit to the mud pump of a well drilling rig, said suction inlet line including a flexible portion or section at its inlet end and a rigid inlet nozzle offset intermediate its ends and connected to the inlet of said flexible section, and mud conditioning means carried by said nozzles comprising a rotatable cutter, and actuating means for said cutter including a rigid shaft extending into the nozzle from the exterior thereof, and a flexible driving shaft operatively connected to said rigid shaft and extending along said flexible portion of the suction inlet line, means for actuating said flexible shaft, and means for holding the flexible shaft in spaced relation to the flexible portion of the inlet line.

6. An apparatus as set forth in claim 5, wherein the mud conditioning means comprises a mud cutter located at the inlet of the nozzle and extending exteriorly thereof.

7. An apparatus as defined in claim 5, wherein the mud conditioning apparatus includes agitating blades mounted on said rigid shaft and within the rigid nozzle.

References Cited in the file of this patent

UNITED STATES PATENTS

| | | |
|---|---|---|
| 2,017,296 | Smith | Oct. 15, 1935 |
| 2,057,366 | Chapman | Oct. 13, 1936 |
| 2,174,323 | Isbell | Sept. 26, 1939 |
| 2,346,180 | Neuman | Apr. 11, 1944 |
| 2,783,098 | Rooney | Feb. 26, 1957 |
| 2,905,506 | Kristensen | Sept. 22, 1959 |